United States Patent
Kuo et al.

(10) Patent No.: US 12,153,735 B2
(45) Date of Patent: Nov. 26, 2024

(54) HEAD-MOUNTED DISPLAY DEVICE AND CONTROL METHOD

(71) Applicant: HTC Corporation, Taoyuan (TW)

(72) Inventors: Yan-Min Kuo, Taoyuan (TW); I-Chiao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/343,731

(22) Filed: Jun. 28, 2023

(65) Prior Publication Data

US 2024/0094810 A1 Mar. 21, 2024

Related U.S. Application Data

(60) Provisional application No. 63/408,473, filed on Sep. 21, 2022.

(51) Int. Cl.
*G06F 3/01* (2006.01)
*G06T 7/00* (2017.01)
*G06T 7/73* (2017.01)

(52) U.S. Cl.
CPC .......... *G06F 3/013* (2013.01); *G06T 7/0002* (2013.01); *G06T 7/73* (2017.01); *G06T 7/97* (2017.01); *G06T 2207/20081* (2013.01); *G06T 2207/30168* (2013.01); *G06T 2207/30201* (2013.01)

(58) Field of Classification Search
CPC ......... G06F 3/013; G06T 7/0002; G06T 7/73; G06T 7/97; G06T 2207/20081; G06T 2207/30168; G06T 2207/30201
See application file for complete search history.

(56) References Cited

U.S. PATENT DOCUMENTS

| | | | | |
|---|---|---|---|---|
| 8,483,450 | B1* | 7/2013 | Derakhshani | G06V 40/18 382/117 |
| 2014/0375540 | A1* | 12/2014 | Ackerman | G06F 3/16 345/156 |
| 2016/0026242 | A1* | 1/2016 | Burns | G06F 3/04817 345/633 |
| 2018/0060700 | A1* | 3/2018 | Bleyer | G06T 7/10 |
| 2018/0270436 | A1* | 9/2018 | Ivarsson | H04N 25/44 |
| 2019/0130579 | A1* | 5/2019 | Heo | G06T 7/20 |
| 2021/0256715 | A1* | 8/2021 | Ryan | G06F 3/013 |
| 2023/0004219 | A1* | 1/2023 | Rana | G06F 3/013 |
| 2023/0045580 | A1* | 2/2023 | Weinberg | G02B 27/017 |
| 2023/0377302 | A1* | 11/2023 | Haller | G06V 40/19 |
| 2024/0054619 | A1* | 2/2024 | Ollila | G06T 5/73 |

FOREIGN PATENT DOCUMENTS

CN 106019587 10/2016

OTHER PUBLICATIONS

"Office Action of Taiwan Counterpart Application", issued on May 13, 2024, p. 1-p. 8.

* cited by examiner

*Primary Examiner* — Hong Zhou
(74) *Attorney, Agent, or Firm* — JCIPRNET

(57) ABSTRACT

A head-mounted display device is provided. The head-mounted display device includes a sensor and a controller. The sensor is configured to capture an eye image of eyes of a user. The controller is coupled to the sensor and configured to: analyze the eye image to generate an analysis result, wherein the analysis result indicates that whether the eyes in the eye image is clear or not; and in response to the analysis result indicating that the eye in the eye image is not clear, output an issue detected signal.

18 Claims, 5 Drawing Sheets

HEAD-MOUNTED DISPLAY DEVICE AND CONTROL METHOD

CROSS-REFERENCE TO RELATED APPLICATION

This application claims the priority benefit of U.S. provisional application Ser. No. 63/408,473, filed on Sep. 21, 2022. The entirety of the above-mentioned patent application is hereby incorporated by reference herein and made a part of this specification.

BACKGROUND

Technical Field

The disclosure relates to a head-mounted display device; particularly, the disclosure relates to a head-mounted display device and a control method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a head-mounted display (HMD) device and a control method, so as to improve tracking an eye of a user.

In this disclosure, a head-mounted display device is provided. The head-mounted display device includes a sensor and a controller. The sensor is configured to capture an eye image of an eye of a user. The controller is coupled to the sensor and configured to: analyze the eye image to generate an analysis result, wherein the analysis result indicates that whether the eye in the eye image is clear or not; and in response to the analysis result indicating that the eye in the eye image is not clear, output an issue detected signal.

In this disclosure, a control method for an eye tracking operation of a head-mounted display device is provided. The control method includes: obtaining, by a sensor, an eye image of an eye of a user; analyzing, by a controller, the eye image to generate an analysis result, wherein the analysis result indicates that whether the eye in the eye image is clear or not; and in response to the analysis result indicating that the eye in the eye image is not clear, outputting an issue detected signal.

Based on the above, according to the head-mounted display device and the control method, an issue that causing the eye in the eye image being not clear may be found and a process for fixing the issue may be performed immediately, thereby increasing the accuracy of the eye tracking.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
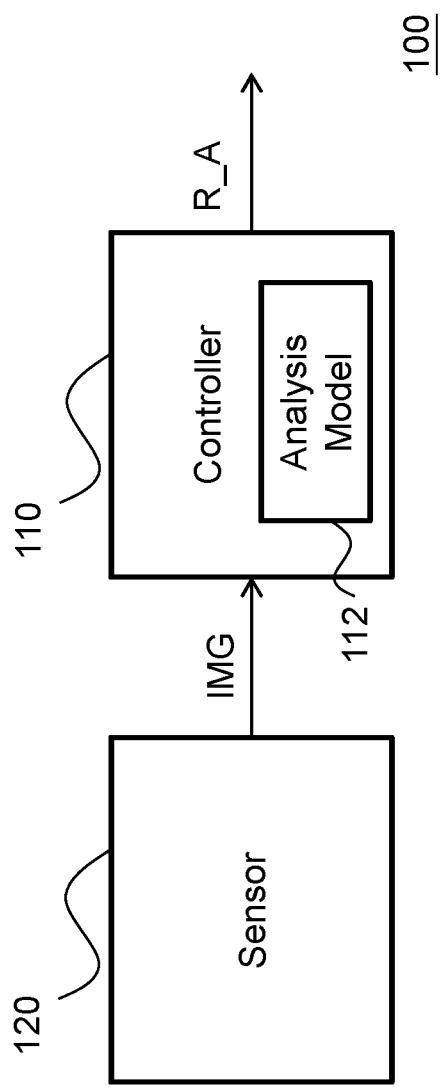
FIG. 1 is a schematic diagram of a head-mounted display device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

Eye tracking is a technology that measures the point of gaze of a user's eye/eyes, which may be used to provide a more immersive experience. By tracking the user's gaze, an object that in the virtual world the user is looking at may be rendered in higher detail to provide a sense of depth and realism. Further, the eye tracking may be used to control a movement of a cursor or to select objects in the virtual world, thereby providing an intuitive and easier way to perform actions in the virtual world. However, while a sensor for providing data for eye tracking is blocked or dirty, the eye tracking may not work properly, thereby decreasing the immersive experience of the user. Hence, how to detect an issue of the eye tracking is happening is becoming an issue to work on.

FIG. 1 is a schematic diagram of a head-mounted display device according to an embodiment of the disclosure. With reference to FIG. 1, a head-mounted display device 100 may include a controller 110 and a sensor 120. The sensor 120 may be coupled to the controller 110. The controller 110 may include an analysis model 112.

In one embodiment, the head-mounted display device 100 may be configured to display content of augmented reality (AR), virtual reality (VR), mixed reality (MR), or Extended Reality (XR). The head-mounted display device may include, for example, a headset, wearable glasses (e.g., AR/VR goggles), other similar devices adapted for AR, VR, MR, XR or other reality related technologies, or a combination of these devices. However, this disclosure is not limited thereto.

In one embodiment, the controller 110 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the controller 110 may be achieved as multiple program codes. The program codes are stored in a memory, and executed by the controller 110. Alternatively, in an embodiment, each of the functions of the controller 110 may be achieved as one or more circuits. The disclosure does not limit the use of software or hardware to achieve the functions of the controller 110.

In one embodiment, the sensor 120, may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. The disclosure is not limited thereto.

In one embodiment, the sensor 120 may be configured to capture an eye image IMG of eye of a user. The controller 110 may be configured to analyze the eye image IMG to generate an analysis result R_A. In one embodiment, the controller 110 may be configured to analyze the eye image IMG based on the analysis model 112, but this disclosure is not limited thereto. In another embodiment, the controller 110 may be configured to analyze the eye image IMG based on a modulation transfer function (MTF) algorithm. The modulation transfer function algorithm may be configured to measure an ability of the sensor 120 and a performance (accuracy) of the sensor 120 may be evaluated.

The analysis result R_A may indicate that whether the eye of the user in the eye image IMG is clear or not. Further, in response to the analysis result R_A indicating that the eye in the eye image IMG is clear, the controller 110 may be configured to perform an eye tracking operation of the eye to generate a tracking result. Furthermore, in response to the analysis result R_A indicating that the eye in the eye image IMG is not clear, the controller 110 may be configured to output an issue detected signal. In one embodiment, the reason causing the eye in the eye image IMG being not clear may include, for example, the eye of the user being partial or completely blocked by an object (e.g., glasses, nose pad of glasses, frame of glasses, dirt on the glasses, fringe), the eye being blurred (e.g., moving eyes, fog on the lens or glasses, lens being dirty), irregular light from the lens (e.g., reflection due to light conditions or dirty lens), or any other similar conditions. However, this disclosure is not limited thereto. The issue detected signal may indicate that an issue is found and the issue may be the reason that causing the eye in the eye image IMG being not clear.

In this manner, the issue that causing the eye in the eye image IMG being not clear may be found and a process for fixing the issue may be performed immediately, thereby increasing the user experience.

FIG. 2A is a schematic diagram of a training scenario of an analysis model according to an embodiment of the disclosure. With reference to FIG. 1 and FIG. 2A, a training scenario 200A of the analysis model 112 is depicted.

In one embodiment, a plurality of training images IMG_T may be prepared. The plurality of training images IMG_T may be labeled with or without a known issue causing an eye in the plurality of training images IMG_T being unclear. That is, each of the plurality of training images IMG_T may be with or without an issue related to eyes of a plurality of training users. Then, the plurality of training images IMG_T may be inputted into the analysis model 112, so that the analysis model 112 may learn that knows what output to expect for each input of the plurality of training images IMG_T. That is, the analysis model 112 may learn how to map the each of the plurality of training images IMG_T to the outputs. In other words, after the training process, based on the analysis model 112, the controller 110 may be able to analyze that whether there is an issue causing an eye in the plurality of training images IMG_T being unclear or not.

Figure 2:
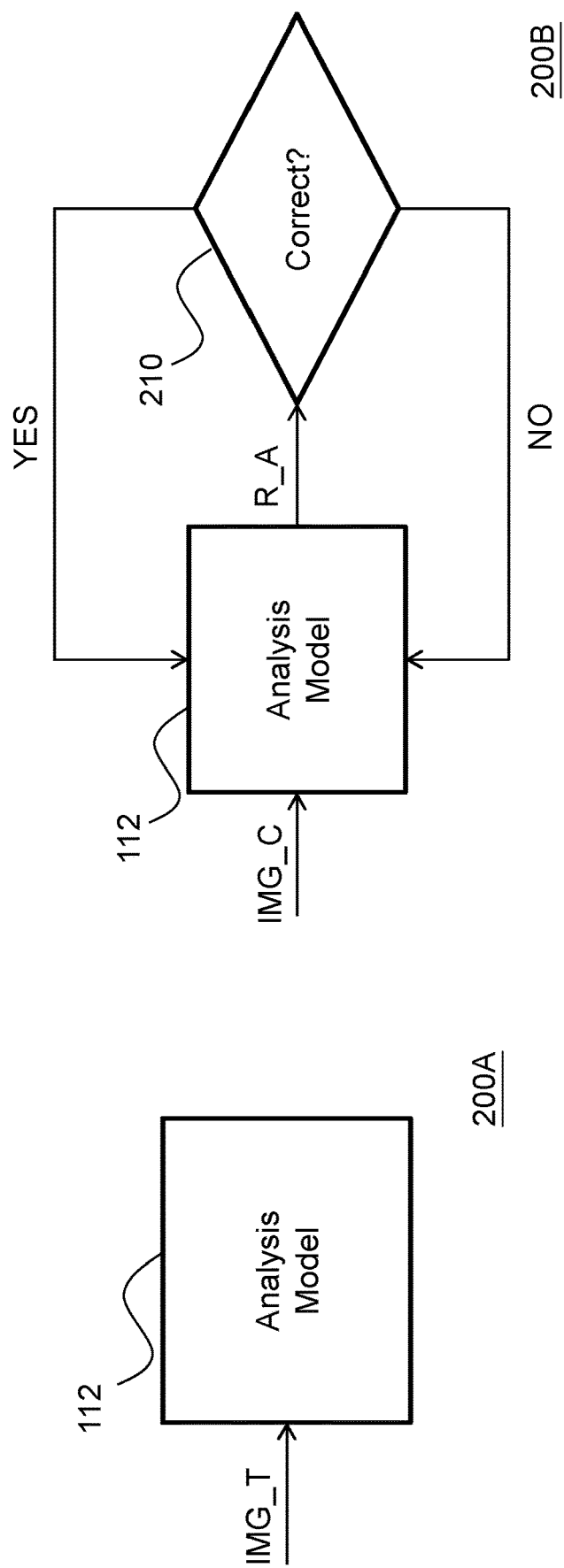
FIG. 2A is a schematic diagram of a training scenario of an analysis model according to an embodiment of the disclosure.
FIG. 2B is a schematic diagram of a training scenario of an analysis model according to an embodiment of the disclosure.

FIG. 2B is a schematic diagram of a training scenario of an analysis model according to an embodiment of the disclosure. With reference to FIG. 1 to FIG. 2B, a training scenario 200B of the analysis model 112 is depicted. Once the training process of the analysis model 112 has been done, it is important to evaluate its performance. By inputting a plurality of checking images IMG_C into the analysis model 112 and checking the outputs respect to the plurality of checking images IMG_C, the performance (accuracy) of the analysis model 112 may be evaluated.

In one embodiment, in response to inputting the plurality of checking images IMG_C into the analysis model 112, the analysis model 112 may output the analysis result R_A. In a step 210, the analysis result R_A may be checked for the accuracy. For example, the plurality of checking images IMG_C may be labeled with or without a known issue causing an eye in the plurality of checking images IMG_C being unclear. The analysis result R_A may be compared with the labels to check the analysis result R_A is correct or not. Alternatively, the analysis result R_A may be manually checked for the accuracy. This disclosure is not limited thereto. While the analysis result R_A is correct, the analysis model 112 may be configured to record that the analysis result R_A is verified and the analysis result R_A is correct. While the analysis result R_A is not correct, the analysis model 112 may be configured to record that the analysis result R_A is verified and the analysis result R_A is not correct. That is, the correctness of the analysis result R_A may be corrected to improve the accuracy of the analysis model 112.

Once the checking process of the analysis model 112 has been done, the controller 110 may be ready to analyze that whether there is an issue causing an eye in the eye image IMG being unclear. That is, in response to receiving the eye image IMG from the sensor 120, the controller 110 may be configured to analyze the eye image IMG based on the analysis model 112 to figure out whether there is an issue causing an eye in the eye image IMG being unclear or not. In this manner, the user experience may be improved.

Figure 3:
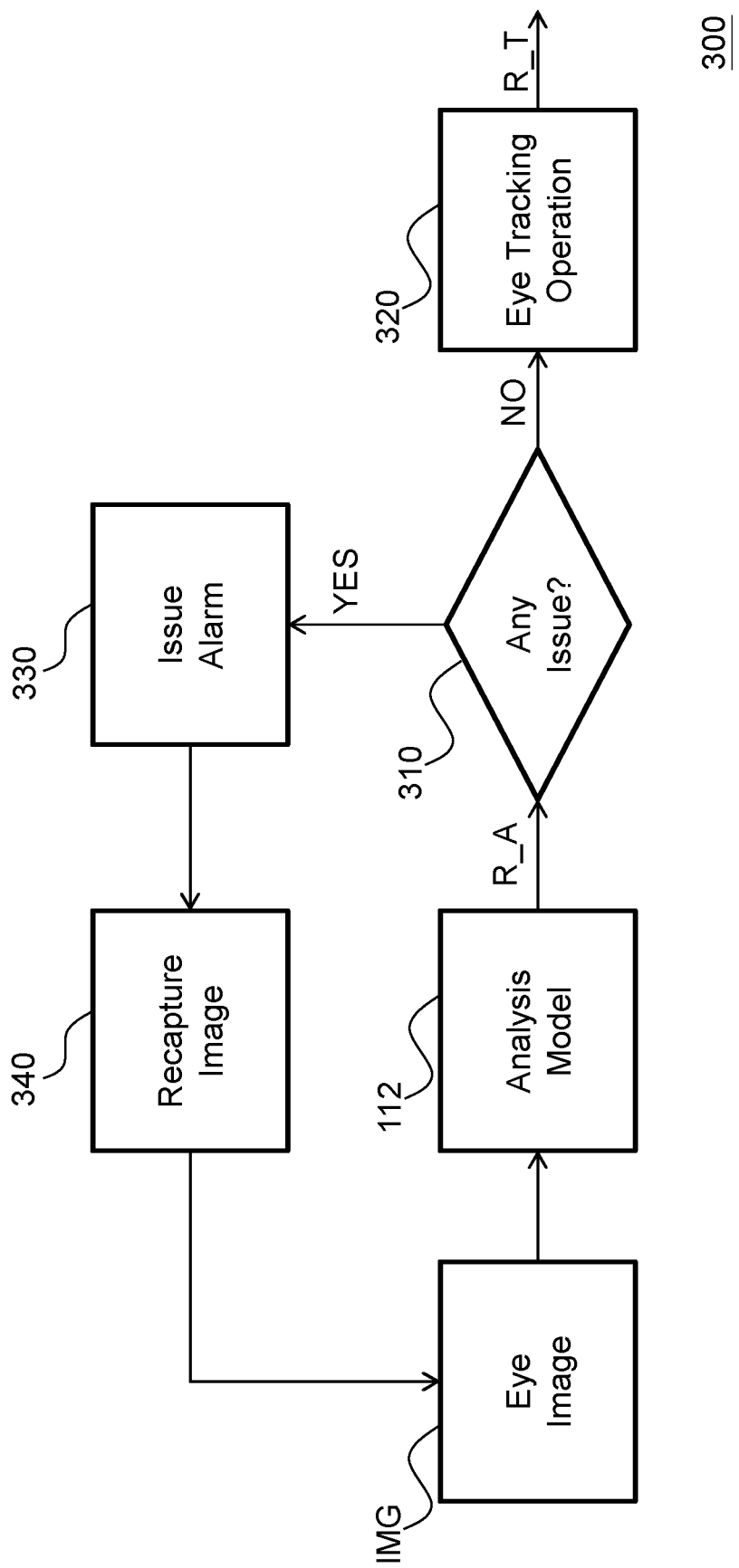
FIG. 3 is a schematic diagram of an eye tracking scenario of a head-mounted display device according to an embodiment of the disclosure.

FIG. 3 is a schematic diagram of an eye tracking scenario of a head-mounted display device according to an embodiment of the disclosure. With reference to FIG. 1 to FIG. 3, an eye tracking scenario 300 of the head-mounted display device 100 is depicted.

In one embodiment, the eye image IMG may be captured by the sensor 120 and the eye image IMG may be provided to the analysis model 112. The analysis model 112 may be configured to generate the analysis result R_A based on the eye image IMG. The analysis result R_A may indicate that whether the eye in the eye image IMG is clear or not. In a step 310, the analysis result R_A may be checked that if there is an issue causing the eye in the eye image IMG being unclear.

In a step 320, in response to the analysis result R_A indicating that the eye in the eye image IMG is clear, an eye tracking operation may be performed by the controller 110 to generate a tracking result. In one embodiment, based on the tracking result, the controller 110 may be further configured to control a virtual eye of a virtual user in a virtual world displayed by the head-mounted display device 100. In response to a point of gaze of the virtual user being changed, a cursor may be moved the virtual world, but this disclosure is not limited thereto.

In a step 330, in response to the analysis result R_A indicating that the eye in the eye image IMG not clear, an alarm or the issue detected signal may be issued by the controller 110. In response to the alarm or the issue detected signal being issued, the sensor 120 may be configured to re-capture a recaptured eye image as the eye image IMG. The recaptured eye image may be provided to the controller 110 for analyzing if there is still an issue or not.

In this manner, the issue that causing the eye in the eye image IMG being not clear may be found and a process for fixing the issue may be performed immediately, thereby increasing the user experience.

Figure 4:
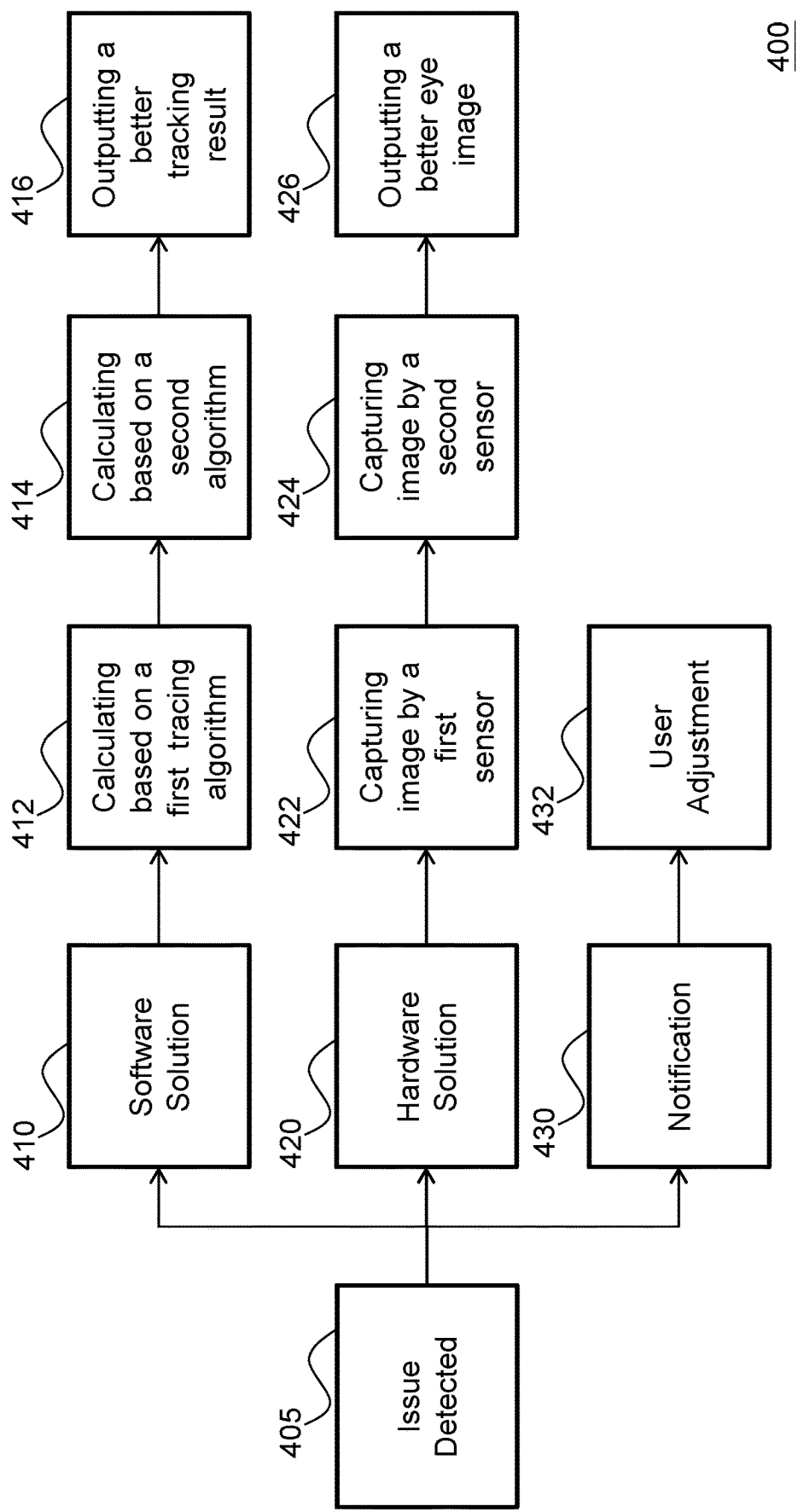
FIG. 4 is a schematic diagram of an eye tracking scenario of a head-mounted display device according to an embodiment of the disclosure.

FIG. 4 is a schematic diagram of an eye tracking scenario of a head-mounted display device according to an embodiment of the disclosure. With reference to FIG. 1 to FIG. 4, an eye tracking scenario 400 is depicted. In a step 405, based on the analysis result R_A, in response to the analysis result R_A indicating that the eye in the eye image IMG is not clear, the controller may be configured to initial a fixing process to fix the issue. The fixing process may include performing a software solution, performing a hardware solution, or sending a notification to the user.

In a step 410, in response to the analysis result R_A indicating that the eye in the eye image IMG is not clear, the controller 110 may be configured to perform the software solution. In one embodiment, the software solution may include a step 412, a step 414, and a step 416. In the step 412, the controller 110 may be configured to calculate the tracking result R_T based on a first tracking algorithm. In the step 414, the controller 110 may be configured to calculate the tracking result R_T based on a second tracking algorithm. That is, the controller 110 may be configured to perform the eye tracking operation based on the first tracking algorithm to generate a first tracking result and perform the eye tracking operation based on the second tracking algorithm to generate a second tracking result. Further, the controller 110 may be configured to compare the first tracking result with the second tracking result to determine a better tracking result. In the step 416, the controller 110 may be configured to output the better tracking result as a result of the eye tracking operation (i.e., the tracking result R_T).

In one embodiment, the first tracking algorithm relates to a pupil location of a pupil of the eye and the second tracking algorithm relates to a corneal limbus location of a corneal limbus of the eye. That is, the first tracking algorithm may be configured to determine a position of an eye based on a pupil of an eye and the second tracking algorithm may be configured to determine a position of an eye based on a corneal limbus of the eye. In one embodiment, the first tracking algorithm is a bright pupil tracking algorithm and the second tracking algorithm is a dark pupil tracking algorithm. That is, the first tracking algorithm is more suitable for tracking an eye of a westerner and the second tracking algorithm is more suitable for tracking an eye of an Asian.

For example, while the pupil of the user is blocked by a dirt on the glasses of the user or a dirt on the lens of the sensor 120, by utilizing an algorithm related to a corneal limbus location of a corneal limbus of the eye, the controller 110 may be able to provide a better tracking result. Therefore, the user experience may be improved.

In a step 420, in response to the analysis result R_A indicating that the eye in the eye image IMG is not clear, the controller 110 may be configured to perform the hardware solution. In one embodiment, the hardware solution may include adjusting a sensor setting of the sensor to recapture an image of the eye to generate a recaptured eye image as the eye image IMG. The sensor setting may include a focal length, a shutter time, or an aperture size of the sensor, but this disclosure is not limited thereto. In one embodiment, the sensor may include a first sensor and a second sensor. The sensor setting may include specifying which sensor to use for capturing the eye image IMG. In one embodiment, the hardware solution may include a step 422, a step 424, and a step 426. In the step 422, the controller 110 may be configured to capturing an image of the eye by the first sensor to generate a first eye image. In the step 424, the controller 110 may be configured to capturing an image of the eye by the second sensor to generate a second eye image. Further, the controller 110 may be configured to compare the first eye image with the second eye image to determine a better eye image. In the step 426, the controller 110 may be configured to output the better eye image as the eye image IMG.

For example, the first sensor of the sensor 120 is dirty, by utilizing the second sensor to capture an image of eye of the user, the controller 110 may be able to provide a better eye image as the eye image IMG. Therefore, the user experience may be improved.

In a step 430, in response to the analysis result R_A indicating that the eye in the eye image IMG is not clear, the controller 110 may be configured to send a notification to the user. In a step 432, in response to the notification (e.g., the issue detected signal) outputting to the user, the user may start a user adjustment to fix the issue causing the eye in the eye image IMG is not clear. For example, the content of the notification may be "please clean the lens". After reading the notification, the user may clean the lens and the issue causing the eye in the eye image IMG is not clear may be fixed. That is, the notification may be configured to perform a calibration action to fix an issue making the eye in the eye image is not clear. In one embodiment, the calibration action may include at least one of cleaning a surface of the sensor, adjusting how the user wears glasses, and adjusting how the user wears the head-mounted display device. However, this disclosure is not limited thereto. In other words, by sending the notification to the user, the user may realize that there is an issue happening and also know how to fix the issue. Therefore, the user experience may be improved.

Figure 5:
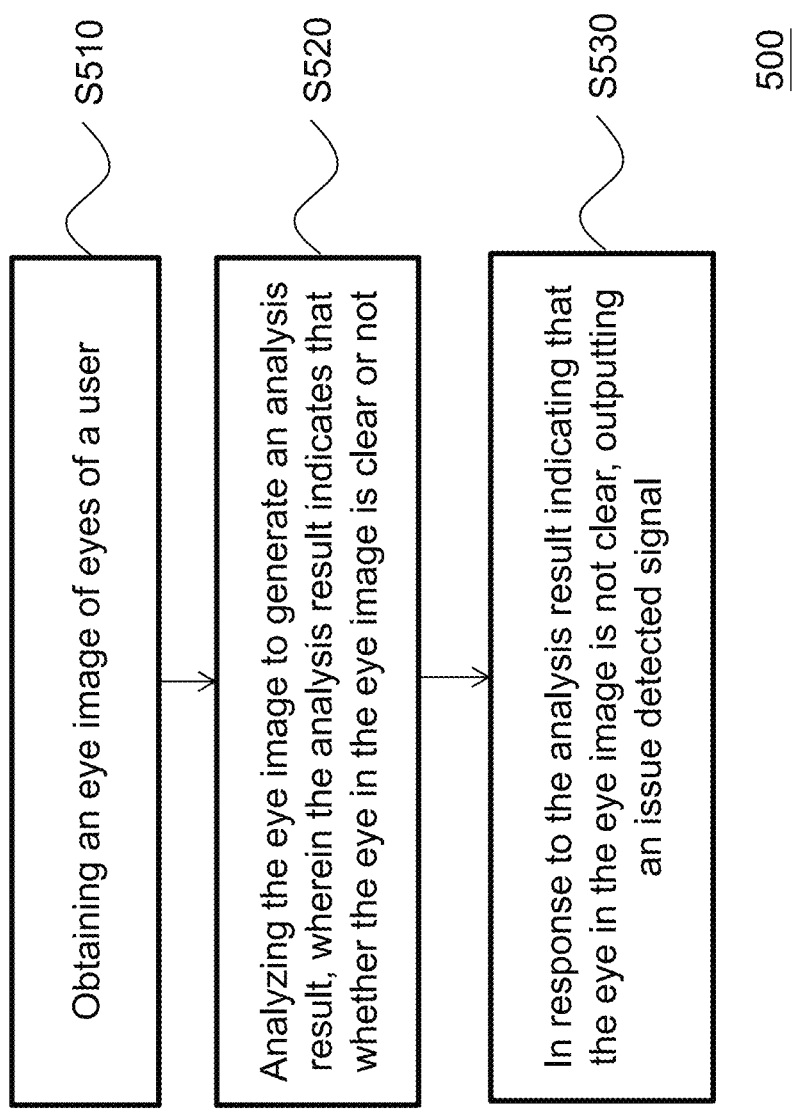
FIG. 5 is a schematic flowchart of a control method for an eye tracking operation of a head-mounted display device according to an embodiment of the disclosure.

FIG. 5 is a schematic flowchart of a control method for an eye tracking operation of a head-mounted display device according to an embodiment of the disclosure. With reference to FIG. 1 to FIG. 5, a control method 500 for an eye tracking operation of a head-mounted display device 100 may include a step S510, a step S520, and a step S530.

In the step S510, the eye image IMG of the eye of the user may be obtained from the sensor 120. In the step S520, the eye image IMG may be analyzed by the controller 110 to generate the analysis result R_A. The analysis result R_A may indicate that whether the eye in the eye image IMG is clear or not. In the step S530, in response to the analysis result indicating that the eye in the eye image is not clear, an issue detected signal may be outputted by the controller 110.

In this manner, the issue that causing the eye in the eye image IMG being not clear may be found and a process for fixing the issue may be performed immediately, thereby increasing the user experience.

In addition, the implementation details of the control method 500 may be referred to the descriptions of FIG. 1 to FIG. 4 to obtain sufficient teachings, suggestions, and implementation embodiments, while the details are not redundantly described seriatim herein.

In summary, according to the head-mounted display device 100 and the control method 500, an issue that causing the eye in the eye image IMG being not clear may be detected and the issue may be fixed by the head-mounted display device 100 or the user. Therefore, the accuracy of the eye tracking is improved, thereby increasing the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display device, comprising:
    a sensor, configured to capture an eye image of an eye of a user; and
    a controller, coupled to the sensor and configured to:
    analyze the eye image to generate an analysis result, wherein the analysis result indicates that whether the eye in the eye image is clear or not; and
    in response to the analysis result indicating that the eye in the eye image is not clear, output an issue detected signal,
    wherein in response to the issue detected signal being outputted, the controller is configured to:
    perform an eye tracking operation based on a first tracking algorithm on the eye image to generate a first tracking result;
    perform the eye tracking operation based on a second tracking algorithm on the eye image to generate a second tracking result;
    compare the first tracking result with the second tracking result to determine a better tracking result; and
    output the better tracking result as a result of the eye tracking operation.

2. The head-mounted display device according to claim 1, wherein
    in response to the issue detected signal outputting to the user, the issue detected signal is configured to perform a calibration action to fix an issue making the eye in the eye image is not clear.

3. The head-mounted display device according to claim 2, wherein
    the calibration action comprises at least one instruction of cleaning a surface of the sensor, adjusting how the user wears glasses, and adjusting how the user wears the head-mounted display device.

4. The head-mounted display device according to claim 1, wherein
    in response to the issue detected signal outputting to the sensor, the sensor is configured to adjust a sensor setting of the sensor to recapture an image of the eye to generate a recaptured eye image as the eye image.

5. The head-mounted display device according to claim 1, wherein the sensor comprises a first sensor and a second sensor, and the controller is configured to:
    capture an image of the eye by the first sensor to generate a first eye image;
    capture an image of the eye by the second sensor to generate a second eye image;
    compare the first eye image with the second eye image to determine a better eye image; and
    output the better eye image as the eye image.

6. The head-mounted display device according to claim 1, wherein
    the first tracking algorithm relates to a pupil location of a pupil of the eye, and
    the second tracking algorithm relates to a corneal limbus location of a corneal limbus of the eye.

7. The head-mounted display device according to claim 1, wherein
    the first tracking algorithm is a bright pupil tracking algorithm, and
    the second tracking algorithm is a dark pupil tracking algorithm.

8. The head-mounted display device according to claim 1, wherein
    the controller is configured to analyze the eye image based on an analysis model, the analysis model is pre-trained with a plurality of training images, and each of the plurality of training images is with or without an issue related to eyes of a plurality of training users.

9. The head-mounted display device according to claim 1, wherein the controller is configured to analyze the eye image based on a modulation transfer function algorithm.

10. The head-mounted display device according to claim 1, wherein the controller is further configured to control a virtual eye of a virtual user in a virtual world displayed by the head-mounted display device based on a tracking result.

11. A control method for an eye tracking operation of a head-mounted display device, comprising:

obtaining, by a sensor, an eye image of an eye of a user;

analyzing, by a controller, the eye image to generate an analysis result, wherein the analysis result indicates that whether the eye in the eye image is clear or not; and in response to the analysis result indicating that the eye in the eye image is not clear, outputting an issue detected signal;

in response to the issue detected signal being outputted:

performing an eye tracking operation based on a first tracking algorithm on the eye image to generate a first tracking result;

performing the eye tracking operation based on a second tracking algorithm on the eye image to generate a second tracking result;

comparing the first tracking result with the second tracking result to determine a better tracking result; and outputting the better tracking result as a result of the eye tracking operation.

12. The control method according to claim 11, further comprising:

in response to the issue detected signal outputting to the sensor, adjusting a sensor setting of the sensor to recapture an image of the eye to generate a recaptured eye image as the eye image.

13. The control method according to claim 11, wherein the sensor comprises a first sensor and a second sensor, and the control method further comprises:

capturing an image of the eye by the first sensor to generate a first eye image;

capturing an image of the eye by the second sensor to generate a second eye image;

comparing the first eye image with the second eye image to determine a better eye image; and outputting the better eye image as the eye image.

14. The control method according to claim 11, wherein the first tracking algorithm relates to a pupil location of a pupil of the eye, and the second tracking algorithm relates to a corneal limbus location of a corneal limbus of the eye.

15. The control method according to claim 11, wherein the first tracking algorithm is a bright pupil tracking algorithm, and the second tracking algorithm is a dark pupil tracking algorithm.

16. The control method according to claim 11, further comprising:

analyzing the eye image based on an analysis model, wherein the analysis model is pre-trained with a plurality of training images, and each of the plurality of training images is with or without an issue related to eye of a plurality of training users.

17. The control method according to claim 11, further comprising:

analyzing the eye image based on a modulation transfer function algorithm.

18. The control method according to claim 11, further comprising:

controlling a virtual eye of a virtual user in a virtual world displayed by the head-mounted display device based on a tracking result.

\* \* \* \* \*